UNITED STATES PATENT OFFICE.

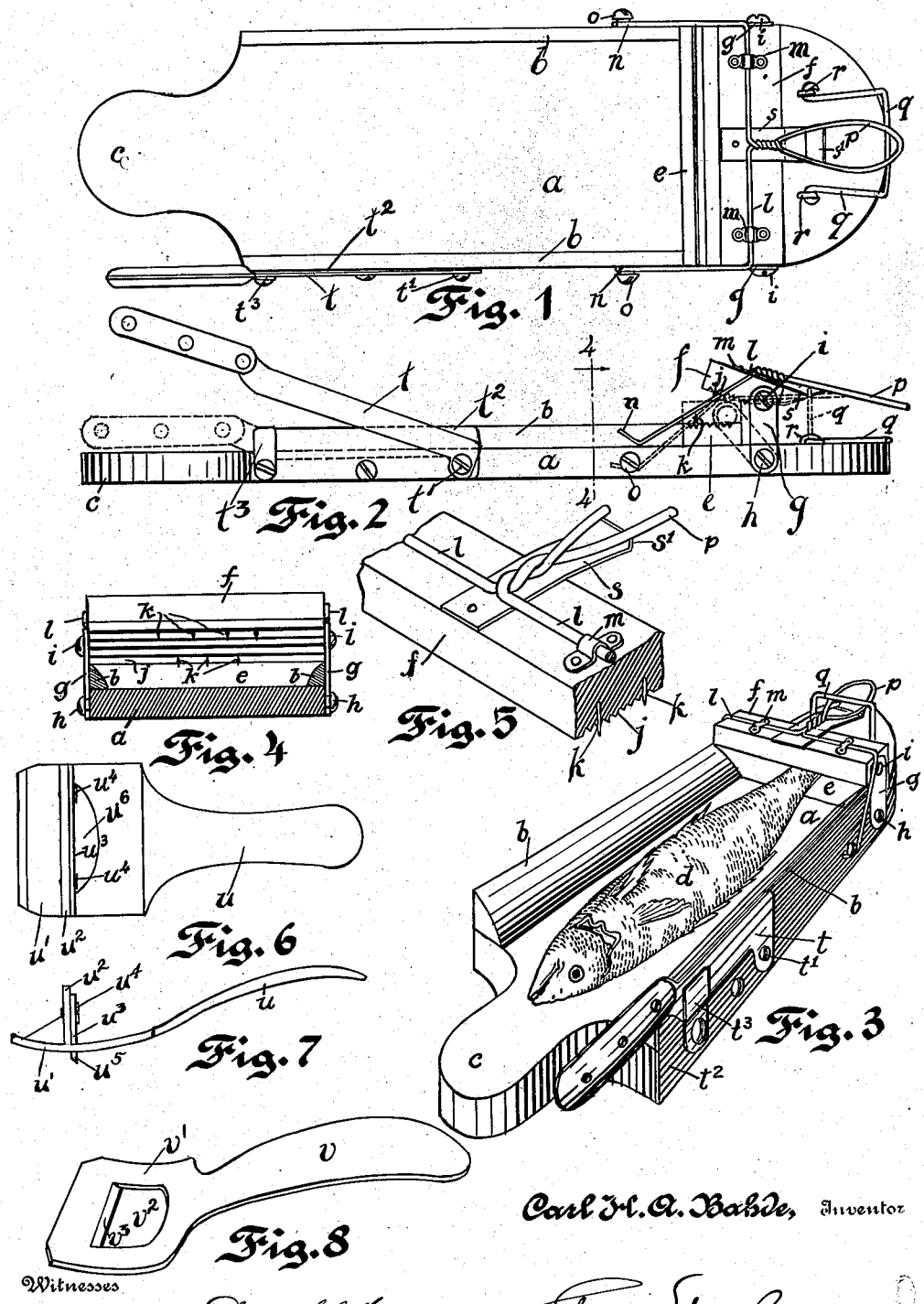

CARL H. A. BAHDE, OF MILWAUKEE, WISCONSIN.

FISH-SCALING APPARATUS.

No. 867,182. Specification of Letters Patent. Patented Sept. 24, 1907.

Application filed June 27, 1906. Serial No. 323,555.

*To all whom it may concern:*

Be it known that I, CARL H. A. BAHDE, of Milwaukee, Wisconsin, have invented a Fish-Scaling Apparatus, of which the following is a specification.

This invention consists in an apparatus for scaling and trimming fish preparatory to cooking, and my object is to produce a device adapted for the rapid and effective scaling of the fish and removing their heads and tails.

My invention may best be understood by a consideration of the following description thereof, reference being had to the accompanying drawings, wherein Figure 1 is a plan view of the scaling-board; Fig. 2 is a side elevation thereof; Fig. 3 is a perspective view thereof; Fig. 4 is a cross-section thereof on the line 4 of Fig. 2; Fig. 5 is a perspective view of a portion of the upper clamping-piece and its attachments; Figs. 6 and 7 are respectively a plan and side elevation of one embodiment of my scaling-tool; Fig. 8 shows in perspective a simpler form of scaling tool.

In these figures each reference character refers always to the same part.

The scaling apparatus comprises a flat board or plate $a$ having side-strips $b$ on the sides thereof and one end formed into a handle $c$, while the other end is provided with a clamping apparatus for securing the tail of the fish $d$ in the manner illustrated in Fig. 3. The clamping apparatus comprises essentially two clamping-blocks $e$ and $f$, the former of which is fixed to the board $a$, while the latter is movably secured thereto by means of a pair of links $g$ pivoted to the board and block respectively by means of screws $h$, $i$. The two clamping-blocks have their opposite faces preferably serrated, as shown at $j$, and further provided with the projecting points $k$ which pierce the tail of the fish and prevent it from escaping from between said blocks when the latter are pressed together.

The means for pressing the block $f$ against the block $e$ consists of a stout wire-bail $l$, which is bent in the manner shown in the drawings and pivoted in cleats $m$ on the upper surface of the block $f$. The ends of said bail are bent rectangularly forward and downward and provided with upwardly bent fingers $n$ on their extremities, which engage with screws $o$ in the sides of the board $a$. The center of the bail is looped and twisted to form a handle $p$ bent in the opposite direction, and is engaged by a second bail $q$ pivoted in eyes $r$ on the board $a$.

In order to clamp the fish in position on the board, the fingers $n$ are caused to engage the screws $o$, and the bail $q$ is forced over the end of the handle $p$, the wire $l$ exercising a certain amount of spring pressure by reason of the distortion so produced. When so clamped, especially if the points $k$ be provided, it is impossible for the tail of the fish to work loose during scaling.

In order to prevent the front edge of the block $f$ from becoming caught in the points $k$ on the lower block, and thus causing annoyance during the clamping operation, I may provide a strip $s$ of spring metal, such as sheet brass, which, as shown, is prolonged backwardly and bent upwardly at $s^1$, so that the clamping action keeps the front edge of the block $f$ always raised until actually clamped, as illustrated in Fig. 2. At one side of the board I provide a trimming-knife $t$ which is pivoted on the screw $t^1$ and coacts with a fixed blade $t^2$ and a guide-strip $t^3$, which holds the blade in position.

The scaling is performed by the tool illustrated in two of its possible forms in Figs. 6 to 8. The tool shown in the first form is ordinarily of cast metal provided with a handle $u$ and a curved working-plate $u^1$, which has a raised lug $u^2$, to which is adjustably secured the blade $u^3$ by means of screws $u^4$. As indicated, the working-edge $u^5$ of the blade projects below the surface of the plate $u^1$ through a hole $u^6$ therein, whereby as the knife is drawn forward over the fish, the scales are scraped off and pass through said hole $u^6$. The form shown in Fig. 8 is simpler and just as effective for most work. It consists of the handle $v$ and working-plate $v^1$, all stamped out of a single piece of sheet metal with an opening $v^2$, from the rear edge of which is bent down the blade $v^3$, the edge of this blade being tempered and sharpened. It will be readily seen that it corresponds, except in the adjustable feature, in construction and use to the tool shown in Figs. 6 and 7.

I do not wish it understood that my invention is limited to the use of all the above described features and constructions, for some may be omitted and others may be varied or modified in various ways, as will readily occur to those skilled in the art.

Having thus described my invention, what I claim as new and desire to secure by Letters Patent is:—

1. A fish-scaling apparatus comprising a plate having raised edges, means for securing a fish thereto at one end of said plate, a handle formed at the other end of said plate, a fixed knife-blade secured to one edge of said plate, and a movable knife-blade coöperating with said fixed blade and pivoted on the edge of said plate.

2. A fish-scaling apparatus comprising, in combination, a plate, a fixed clamping block secured to said plate near one end thereof, a movable clamping-block loosely connected in a longitudinally shiftable manner to said plate, and means for pressing said movable clamping-block against said fixed clamping-block.

3. In a fish-scaling apparatus, clamping devices comprising a fixed clamping-member having projecting parts secured thereto at one side thereof, a movable clamping-member adapted to coöperate therewith, a member having fingers gripping under said projecting parts and a handle extending in the opposite direction, and means for holding said handle pressed down on the other side of said fixed block.

4. A fish-scaling apparatus comprising a plate, a fixed clamping-block secured near one end thereof, a movable clamping-block coöperating therewith and connected with said plate by means of links pivoted to said plate and block, a bail-shaped member pivoted to the upper face of said movable block and having its legs extending rectangularly in one direction and a handle extending rectangularly in the other direction, means on said plate for engaging the ends of said legs, and a bail pivoted on said plate adapted to engage over the end of said movable block in pressed-down position.

5. A fish-scaling apparatus comprising a plate, a fixed clamping-block secured near one end thereof, a movable clamping-block coöperating therewith and connected with said plate by means of links pivoted to said plate and block, a bail-shaped member pivoted to the upper face of said movable block and having its legs extending rectangularly in one direction, and a handle extending rectangularly in the other direction, means on said plate for engaging the ends of said legs, a bail pivoted on said plate adapted to engage over the end of said handle to hold said movable block in pressed-down position, and a light spring-member secured to the face of said movable block under said handle and projecting into contact with said handle.

6. A fish-scaling apparatus comprising a plate having a clamping surface at one end thereof, a movable clamping-block having a surface coöperating with said clamping-surface, a pair of links at the respective ends of said movable clamping-block and through which said block is connected to said plate, and a clamping lever adapted to press said clamping-block against said clamping-surface.

7. A fish-scaling apparatus, comprising, in combination, a plate adapted to receive and support a fish, said plate having raised beads on its lateral edges, a raised clamping-surface at one end of said plate, a clamping-block having a clamping-surface on its under side coöperating with said first-named clamping-surface, a pair of links connected to said clamping-block at opposite ends thereof, whereby said block has a lateral shiftable motion to enable it to adapt itself to said fixed clamping-surface, and means for pressing said movable clamping-block against said fixed clamping-surface.

In witness whereof I have hereunto set my hand this ninth day of June, 1906.

CARL H. A. BAHDE.

In presence of—
GEORGE W. COLLES,
W. D. MACHLEITH.